(No Model.)
J. PLUMRIDGE, Jr., & S. JACKSON.
BAND SAW GUIDE.
No. 450,871. Patented Apr. 21, 1891.
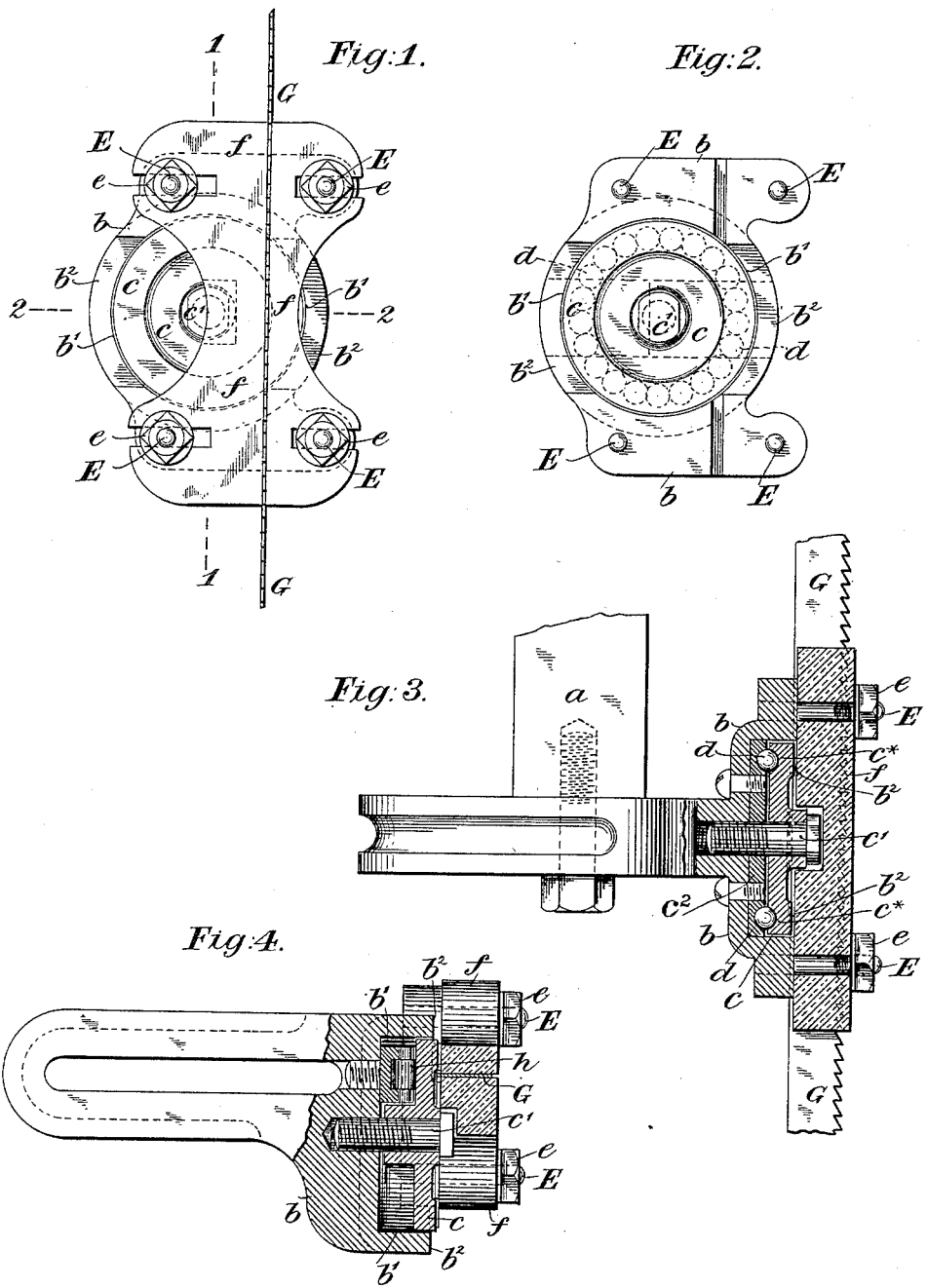

UNITED STATES PATENT OFFICE.

JONATHAN PLUMRIDGE, JR., OF HIGH WYCOMBE, AND SPENCER JACKSON, OF TETSWORTH, ENGLAND.

BAND-SAW GUIDE.

SPECIFICATION forming part of Letters Patent No. 450,871, dated April 21, 1891.

Application filed June 16, 1890. Serial No. 355,632. (No model.)

*To all whom it may concern:*

Be it known that we, JONATHAN PLUMRIDGE, Jr., manager of saw-mills, of Denmark Street and Désborough Road, High Wycombe, in the county of Buckingham, England, and SPENCER JACKSON, engineer, of Chinnor, Tetsworth, in the county of Oxford, England, subjects of the Queen of Great Britain, have invented new and useful Improvements in or Connected with Band-Saw Guides, of which the following is a specification.

This invention relates to improvements in or connected with band-saw guides, and has for its object to guide the saw more truly and with less friction than heretofore. For this purpose we employ an arm or bracket, which is mounted on the machine with capability of vertical or horizontal adjustment to accommodate the varying thicknesses of the work or width of saws employed, and upon the end of the arm or bracket we form a head with projecting screw studs or bolts. In the face of the head we form a recess, within which is placed a disk of hardened steel, mounted upon a suitable axis with capability of revolution. In order that the said disk may revolve freely on its axis, we arrange within the said recess some suitable anti-frictional device, such as a number of balls or rollers, or a wheel or roller having an axis at right angles to that of the disk. When the anti-frictional device employed, as lastly stated, consists of a number of balls or rollers, we fix at the back of the recess a disk or plate formed with an annular groove, and on the inner face of the loose disk we form a corresponding annular groove, the balls or rollers being situated within the groove or chase formed by the two annular grooves. When a wheel or roller is employed as an anti-frictional device, the same is mounted with capability of revolution upon an axis which is at right angles to the axis of the disk, and it is so arranged within the recess that it will be in or near the same vertical plane as the saw-blade. In the face of the head, above and below the loose disk and near to one edge thereof, we form grooves to receive the back of the saw and permit it to rest against and run in contact with the loose disk, which constitutes a guide in that direction, and in order to guide and support the saw laterally, we employ two wooden guide-blocks, which are in their outer edges provided with open-ended slots to receive the screw studs or bolts of the head and permit of adjustment for different thicknesses of saws. The said wooden guide-blocks are securely clamped to the face of the head, with the saw between their inner edges, by means of nuts screwing into the studs or bolts, and in order that the wooden blocks may form an efficient guide, they are, when commencing work, set up tightly, leaving the saw to form for itself a smooth chase between them.

We will now proceed to refer to the accompanying drawings, from which the nature of our said invention will be more clearly understood.

The same letters of reference indicate like parts in all the figures.

In the drawings, Figure 1 is a front view of a band-saw guide constructed in accordance with this invention. Fig. 2 is a like view with the two wooden guide-blocks removed; and Fig. 3 is a vertical section taken through the line 1 1, Fig. 1. In Figs. 2 and 3 the anti-frictional device illustrated consists of a number of balls arranged within the annular grooves in the two metal disks. Fig. 4 is a horizontal section taken through the line 2 2, Fig. 1, of a band-saw guide constructed in accordance with this invention, in which a wheel or roller, arranged as hereinbefore described, is employed as an anti-frictional device.

$a$ is the before-mentioned arm or bracket of the machine.

$b$ is the head of the guide, and $b'$ is the recess formed in the face thereof. The loose disk $c$ is mounted on the axis $c'$, which is capable of being tightened up to compensate for any wear in the frictional devices or bearing-surfaces.

In Fig. 3, $c^2$ is the disk or plate fixed at the back of the recess $b'$. $c^x c^*$ are the annular grooves in the disks $c\ c^2$, and $d$ are the balls against which the loose disk $c$ revolves. E are the screw studs or bolts projecting from the head $b$, and which, with the nuts $e$, serve to clamp the two wooden guide-blocks $f\ f$. G is the saw-blade. The face of the head $b$ is cut down at $b^2$ to allow of the escape of dust.

In Fig. 4, $h$ is the anti-frictional wheel or roller against the periphery of which the inner face of the disk $c$ bears. On the saw-blade being caused to travel, it will, by the resistance of the material being acted upon, be pressed back on the disk $c$, which consequently revolves on its axis $c'$ against the anti-frictional device, thereby greatly reducing the wearing action of the back of the saw on the guide.

What we claim is—

A band-saw guide consisting of a suitable support, adjustable side guides, a rotatable disk mounted upon a suitable axis and adapted to support the band-saw on one of its faces near its periphery, and anti-friction rollers between the support and inner face of the disk, whereby said disk is evenly supported and the friction between it and the support is lessened, as herein set forth.

JONATHAN PLUMRIDGE, JR.
SPENCER JACKSON.

Witnesses:
GEO. E. VAUGHAN,
  57 *Chancery Lane, London.*
ARTHUR DUNSFORD,
*Sunnyside House, Chingford, Essex, England.*